US012438918B2

(12) United States Patent
Dalla et al.

(10) Patent No.: US 12,438,918 B2
(45) Date of Patent: Oct. 7, 2025

(54) REAL TIME COACHING AND PREVENTION OF HUMAN-CENTRIC SECURITY VULNERABILITIES

(71) Applicant: Palo Alto Networks, Inc., Santa Clara, CA (US)

(72) Inventors: Mohammed Mohsin Dalla, Bangalore (IN); Avishek Bhattacharya, Bangalore (IN); Anurag Singhal, Dwarka (IN)

(73) Assignee: Palo Alto Networks, Inc., Santa Clara, CA (US)

( * ) Notice: Subject to any disclaimer, the term of this patent is extended or adjusted under 35 U.S.C. 154(b) by 31 days.

(21) Appl. No.: 18/526,507

(22) Filed: Dec. 1, 2023

(65) Prior Publication Data
US 2025/0184361 A1   Jun. 5, 2025

(51) Int. Cl.
*H04L 9/40* (2022.01)
*G06V 30/262* (2022.01)

(52) U.S. Cl.
CPC ............ *H04L 63/20* (2013.01); *G06V 30/262* (2022.01); *H04L 63/1441* (2013.01)

(58) Field of Classification Search
CPC .................................................... G06V 30/262
See application file for complete search history.

(56) References Cited

U.S. PATENT DOCUMENTS

| | | | | |
|---|---|---|---|---|
| 11,599,890 | B1* | 3/2023 | Kalaboukis | H04L 63/1408 |
| 2020/0336453 | A1* | 10/2020 | Baracaldo Angel | H04L 51/212 |
| 2022/0279015 | A1* | 9/2022 | Sambamoorthy | H04L 51/212 |
| 2022/0394047 | A1* | 12/2022 | Lee | H04L 63/145 |
| 2024/0396937 | A1* | 11/2024 | Morris | H04L 63/1416 |

* cited by examiner

*Primary Examiner* — Nicholas P Celani
(74) *Attorney, Agent, or Firm* — Gilliam IP PLLC

(57) ABSTRACT

The disclosed system generates "real-time" notifications to prevent cybersecurity violations while also effectively training users. The system captures text from a user interface and selects a set of task instructions based on whether the text corresponds to an outgoing or incoming communication. If the captured text is incoming, the system selects task instructions related to phishing. If the captured text is (intended) outgoing, then the system selects task instructions related to data leakage. The system forms a prompt with the selected task instructions and the captured text and then inputs the prompt to a generative language model. If the response from the generative language model indicates a cybersecurity violation, such as either phishing or potential data leakage, then the system generates a notification accordingly. The system also records generation of notifications per user to facilitate risk assessment.

17 Claims, 8 Drawing Sheets

REAL TIME COACHING AND PREVENTION OF HUMAN-CENTRIC SECURITY VULNERABILITIES

BACKGROUND

The disclosure generally relates to computing arrangements based on computational models (e.g., CPC G06N) and electrical digital data processing related to handling natural language data (e.g., CPC G06F 40/00).

Social engineering cyberattacks are manipulative tactics employed by malicious actors to exploit human psychology and manipulate individuals into divulging sensitive information or performing actions that compromise their digital security. Phishing, a common social engineering technique, involves the use of deceptive emails, messages, or websites that impersonate trusted entities to trick recipients into revealing personal credentials, financial details, or clicking on malicious links.

A social engineering attack, such as phishing, can lead to data loss and/or data leakage. Data loss and/or data leakage can also be the result of human error unrelated to an attack. Data leakage is the loss of control or compromise of confidential or sensitive data and data and/or exposure of confidential or sensitive data to unauthorized entities. Data loss is destruction or loss of access to data.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

This description uses the terms notification and alert in their plain and ordinary meaning, which is sometimes not used in application specific contexts. A "notification" is information or a message that brings awareness of something (e.g., an event) to a consumer of the notification. An "alert" refers to a notification intended to bring more cautious awareness or to warn.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

A substantial amount of cybersecurity vulnerabilities involve human behavior. The disclosed system generates "real-time" notifications to prevent successful phishing and to prevent data leakage while also effectively training users to become aware of user social engineering attack techniques and behavior that can lead to data leakage. The system captures text from a user interface and selects a set of task instructions based on whether the text corresponds to an outgoing or incoming communication. If the captured text is incoming, the system selects task instructions related to phishing. If the captured text is (intended) outgoing, then the system selects task instructions related to data leakage. The system forms a prompt with the selected task instructions and the captured text and then inputs the prompt to a generative language model. If the response from the generative language model indicates a cybersecurity violation, such as either phishing or potential data leakage, then the system generates a notification accordingly. The system also records generation of notifications per user. Over time risk behavior of entities can be assessed with the recorded notifications data and used in decisions on additional training.

Example Illustrations

Figure 1:
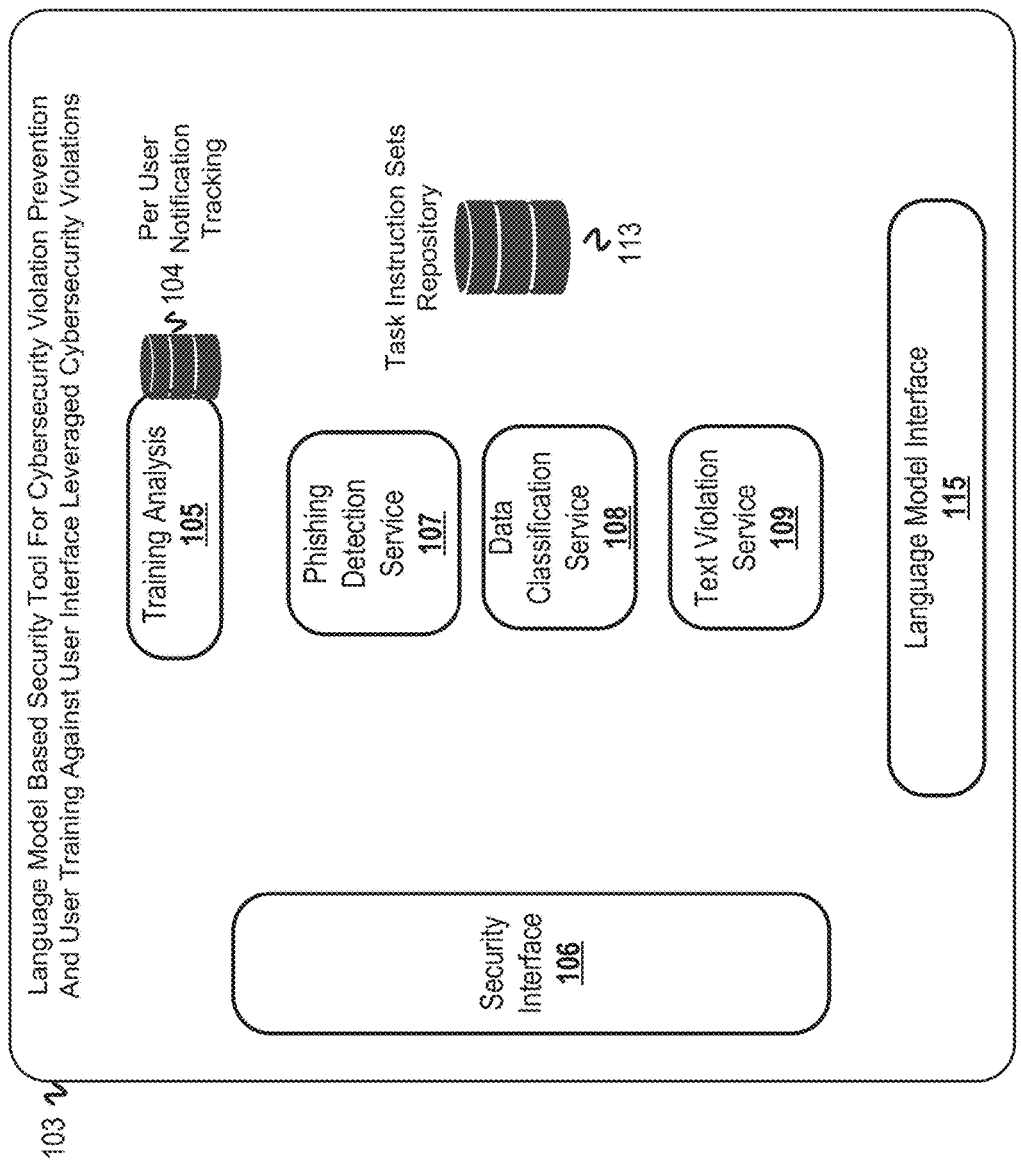
FIG. 1 is a conceptual diagram of a language model based security tool for simultaneously preventing cyberattacks and training users with notifications.

FIG. 1 is a conceptual diagram of a language model based security tool for simultaneously preventing cyberattacks and training users with notifications. FIG. 1 depicts a language model based security tool 103 with multiple components for detecting whether a communication presented in a user interface is a "cybersecurity violation" and generating data for analyzing user behavior that can be used in training decisions and risk assessment. "Cybersecurity violation" refers to a violation of a mission or purpose to protect an individual's or organization's computing resources (e.g., systems and applications) and data, whether defined in a policy or not. The language model based security tool 103 may be implemented as a plugin or an extension to an application, such as a messaging application or a browser. The language model based security tool 103 includes a security interface 106, a training analysis component 105, a phishing detection service 107, a data classification service 108, a text violation service 109, a repository 113 of task instructions sets, and a language model interface 115. The training analysis component 105 includes or has access to a repository 104 in which data is hosted for tracking notifications per user. The security interface 106 detects events of a user interface of an application corresponding to communications that may be incoming or intended to be outgoing (e.g., text entered into a field to be sent but not yet sent) with respect to the user interface. The security interface 106 captures text from the events and passes the text to either the phishing detection service 107 or the text violation service 109 depending upon the type of event corresponding to the captured text. The phishing detection service 107 and the text violation service 109 retrieve appropriate task instruction sets from the repository 113 depending upon the type of event corresponding to captured text. The phishing detection service 107 and the text violation service 109 will form a natural language prompt from retrieved text instruction sets and the captured text. The prompt is then submitted to the language model interface 115 which inputs the formed prompt to a language model. For example, the language model interface 115 can input the formed prompt to a large language model of a third party or an in house language model. The examples below describe the data classification service 108 as operating upon inputs from the text violation service 109. This is not intended to imply a dependency between the services 108, 109. Embodiments do not necessarily obtain a data classification based on a verdict of the text violation service 109. The data classification service 108 is an independent service that can be invoked independently of the text violation service 109. For instance, a security tool implementation can provide the data classification service 108 as an on-demand service accessible from a user interface. For example, a user can submit input to the data classification service 108 prior to entering the text into a message input field. The user can then make a decision about the text based on the classification from the data classification service 108.

Figure 2:
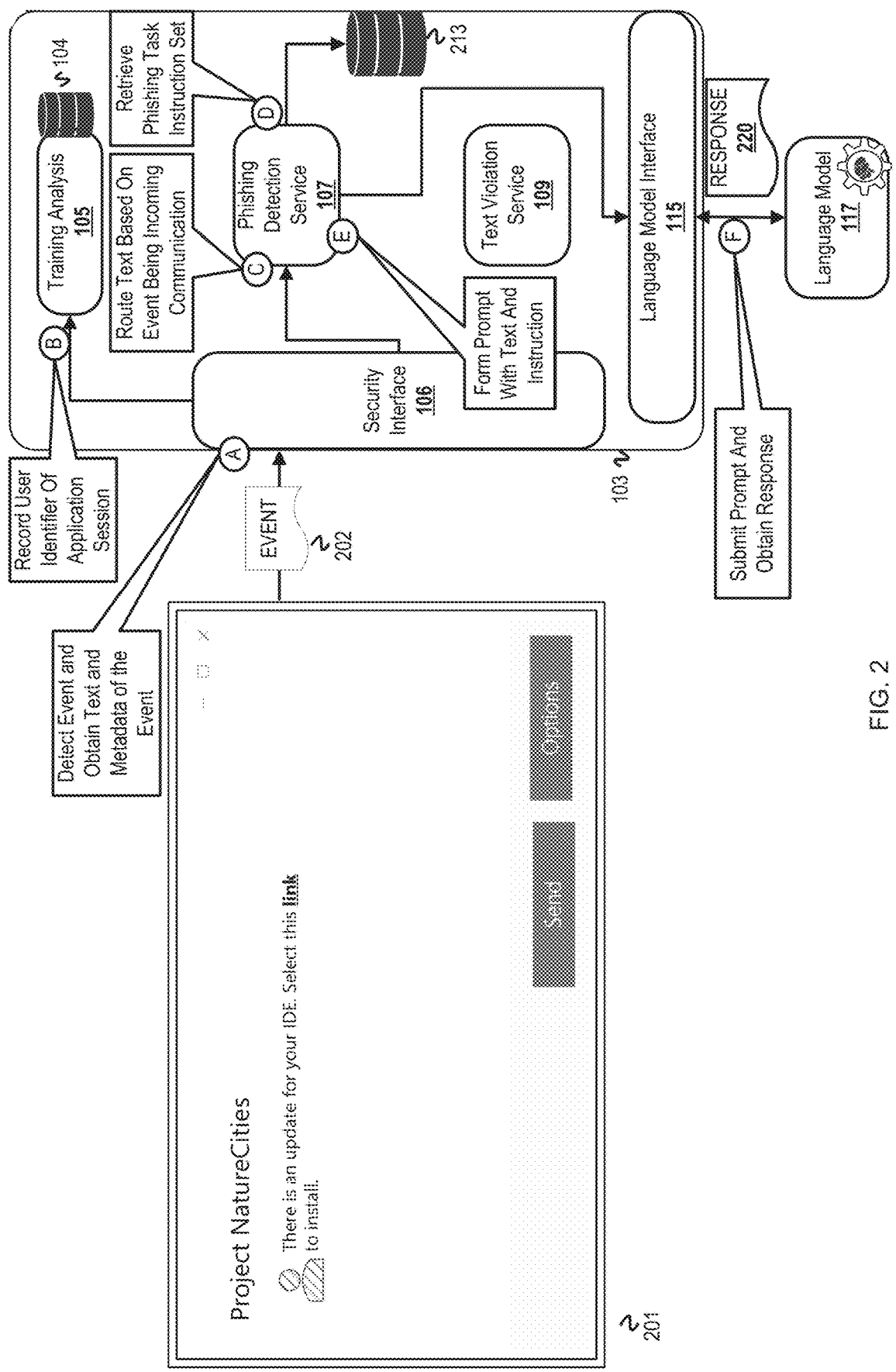
FIGS. 2-5 are diagrams of example scenarios of the language model based security tool responding to communication events detected at a user interface of an application.
Figure 3:
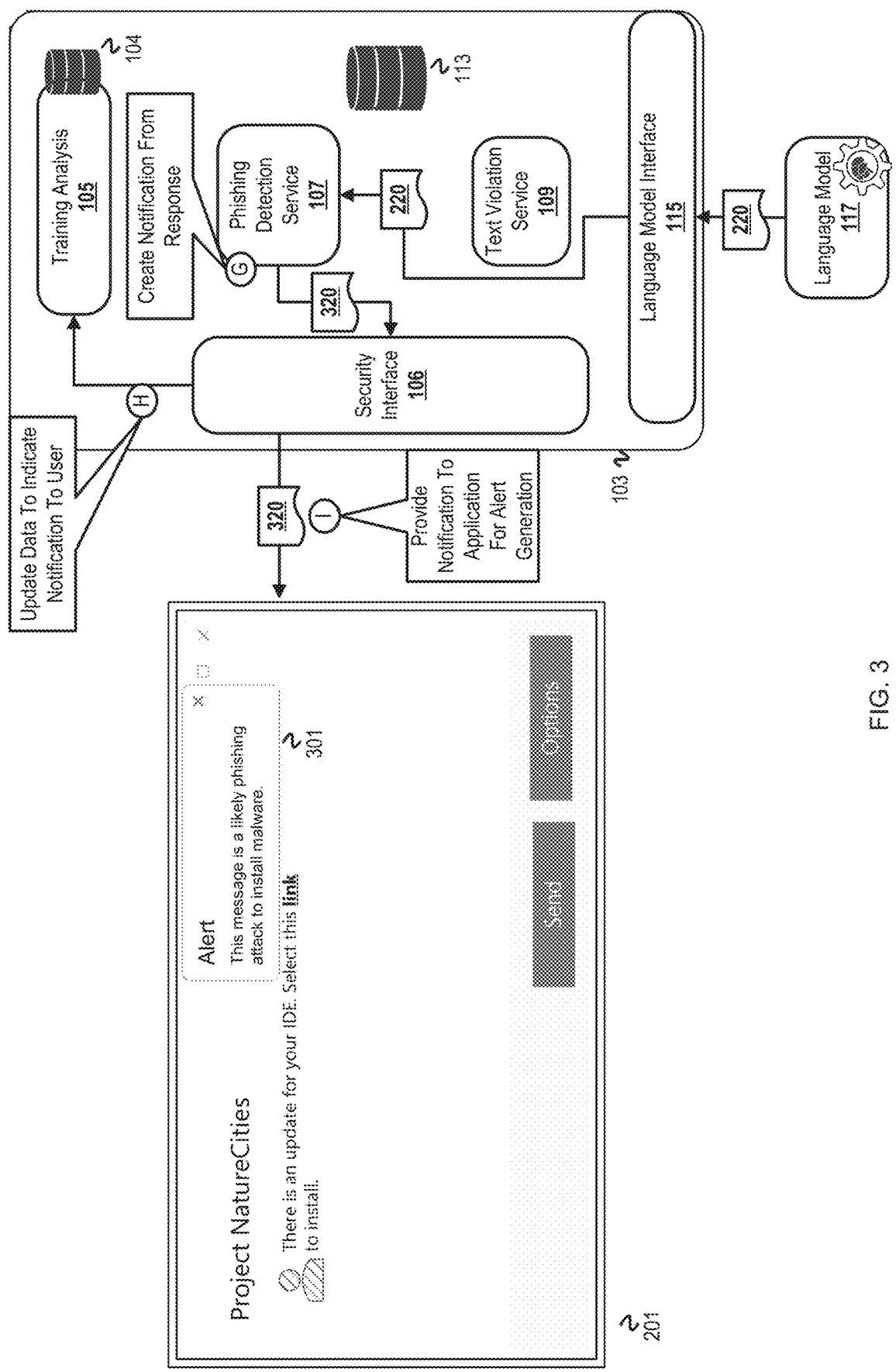

FIGS. 2-5 are diagrams of example scenarios of the language model based security tool responding to communication events detected at a user interface of an application. Throughout FIGS. 2-5, components of the language model based security tool ("security tool") 103 are not depicted if not involved in the example operations due to space constraints. An example user interface 201 is depicted throughout the FIGS. 2-5 to illustrate a series of communications that would trigger the various components of the security tool 103. Each of FIGS. 2-5 is annotated with a series of letters that each represents stages of one or more operations. Although these stages are ordered for this example, the stages illustrate one example to aid in understanding this disclosure and should not be used to limit the claims. Subject matter falling within the scope of the claims can vary from what is illustrated. FIG. 2 and FIG. 3 are diagrams of an example scenario corresponding to an incoming communication and together depict stages A-I.

At stage A, the security tool 103 detects an event 202 and obtains/captures text and metadata from the event 202. The metadata includes a user identifier that identifies a user currently associated with the application of the user interface 201. In FIG. 2, the user interface 201 presents an incoming message that states "There is an update for your IDE. Select this link to install." The "link" text is a hyperlink to a website for installing software.

At stage B, the security interface 106 passes the metadata including the user identifier to the training analysis component 105. The training analysis component 105 records the user identifier of the application session into the repository 104. In some cases, the security tool 103 will detect a login event for the application corresponding to the user interface 201 and record the initial user identifier while the session of the user interface 201 remains active. The training analysis component 105 may record a type of the event 202 and associate it with the user identifier in the repository 104.

At stage C, the security interface 106 routes the captured text to the phishing detection service 107 based on the event 202 corresponding to an incoming communication. The security interface 106 will parse a received event to determine whether the event corresponds to an incoming communication or an intended outgoing communication. After determining that the event 202 corresponds to an incoming communication, the security interface 106 invokes the phishing detection service 107 and passes the captured text from the event to the phishing detection service 107.

At stage D, the phishing detection service 107 retrieves a phishing task instruction set from the repository 113. The phishing detection service 107 retrieves the phishing task instruction set based on receipt of the captured text from the security interface 106. The task instruction set retrieved by the phishing detection service 107 will include multiple instructions for a language model. Examples of the instructions include determining whether the text corresponds to a phishing attempt, a user target of the phishing attempt, a data target of the phishing attempt, etc.

At stage E, the phishing detection service 107 forms a prompt with the text and the instruction set. The phishing detection service 107 combines the captured text and the retrieved instruction set according to implementation. As an example, the phishing detection service 107 can form the prompt according to a defined template or simply append the captured text to the retrieved task instruction set. Implementations can use markers to delineate the instructions from the text. This will vary depending upon the model used, fine tuning of the model, previous prompt engineering, etc.

At stage F, the language model interface 115 receives the prompt from the phishing detection service 107 and submits the prompt to the language model 117. In this example illustration, the language model 117 is a third party model. Thus, the language model interface 115 provides the prompt formed by the phishing detection service 107 according to an exposed application programming interface (API) of a model platform providing the language model 117. Stage F also includes receipt of a response 220 by the language model interface 115 from the language model 117.

In FIG. 3, the security tool 103 processes the response 220 from the language model 117. The example operations depicted in FIG. 3 presume that the response 220 from the language model 117 indicates that a phishing attempt was detected in the submitted text. The response 220 flows through the language model interface 115 to the phishing detection service 107. At stage G, the phishing detection service 107 creates a notification 320 from the response. Creation of the notification 320 may be populating a data structure or document with the response 220. In some cases, the language model 117 will not have been able to respond to some of the task instructions. The phishing detection service 107 may create the notification 320 with indications of the lack of response or disregard task instructions that lack response. The phishing detection service 107 passes the notification 320 to the security interface 106. The security interface 106 communicates with the training analysis component 105 indicating the response from the language model 117. At stage H, the training analysis component 105 updates repository 104 to indicate the notification 320 created for the user associated with the active session of the user interface 201. At stage I, the security interface 106 provides the notification 320 to the application of the user interface for alert generation. Accordingly, the user interface 201 generates an alert 301. The alert 301 in FIG. 3 indicates the message "This message is a likely phishing attack to install malware." The alert 301 should prevent the user from selecting the link while also training the user to recognize a phishing attack.

Figure 4:
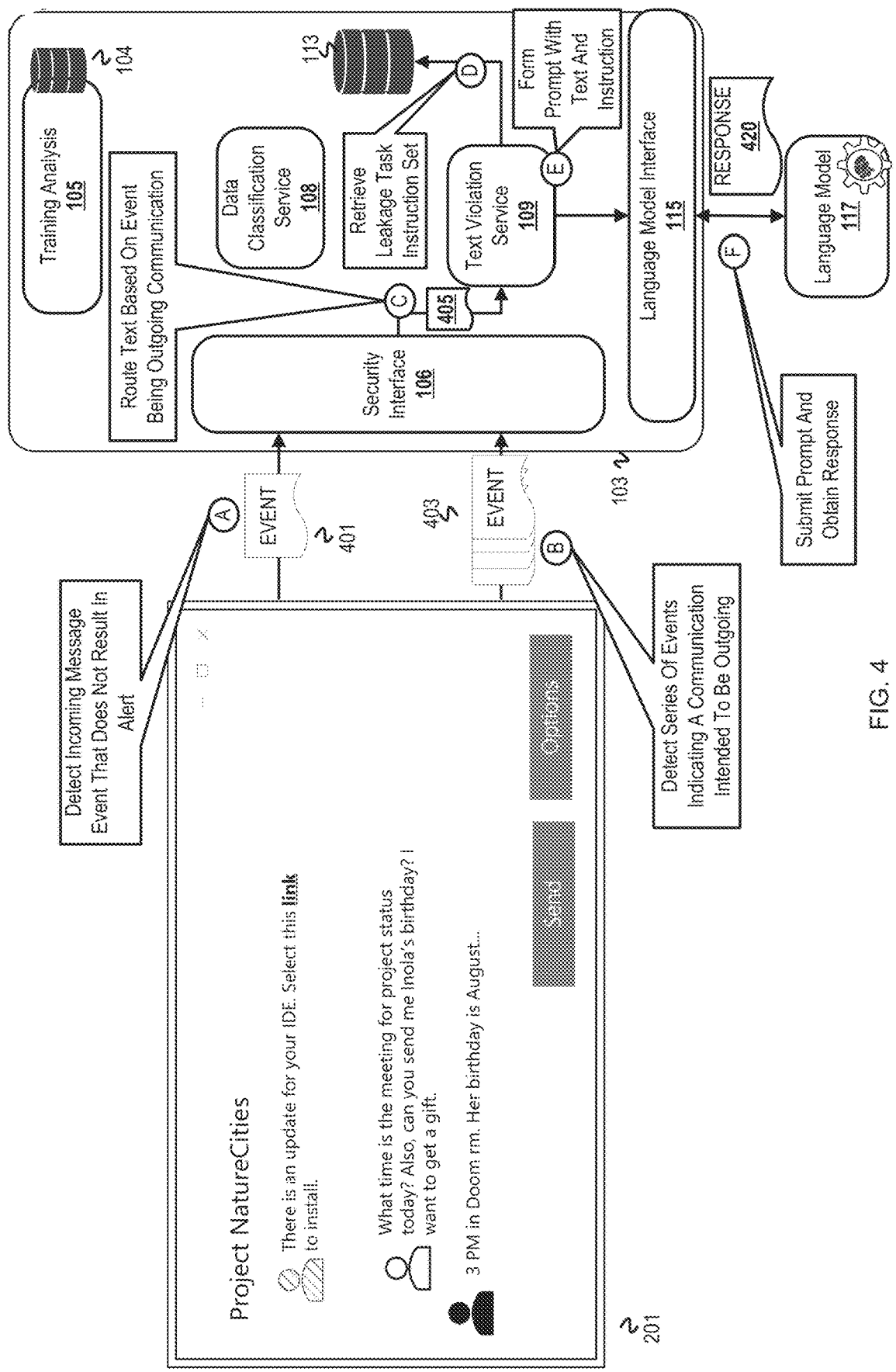
Figure 5:
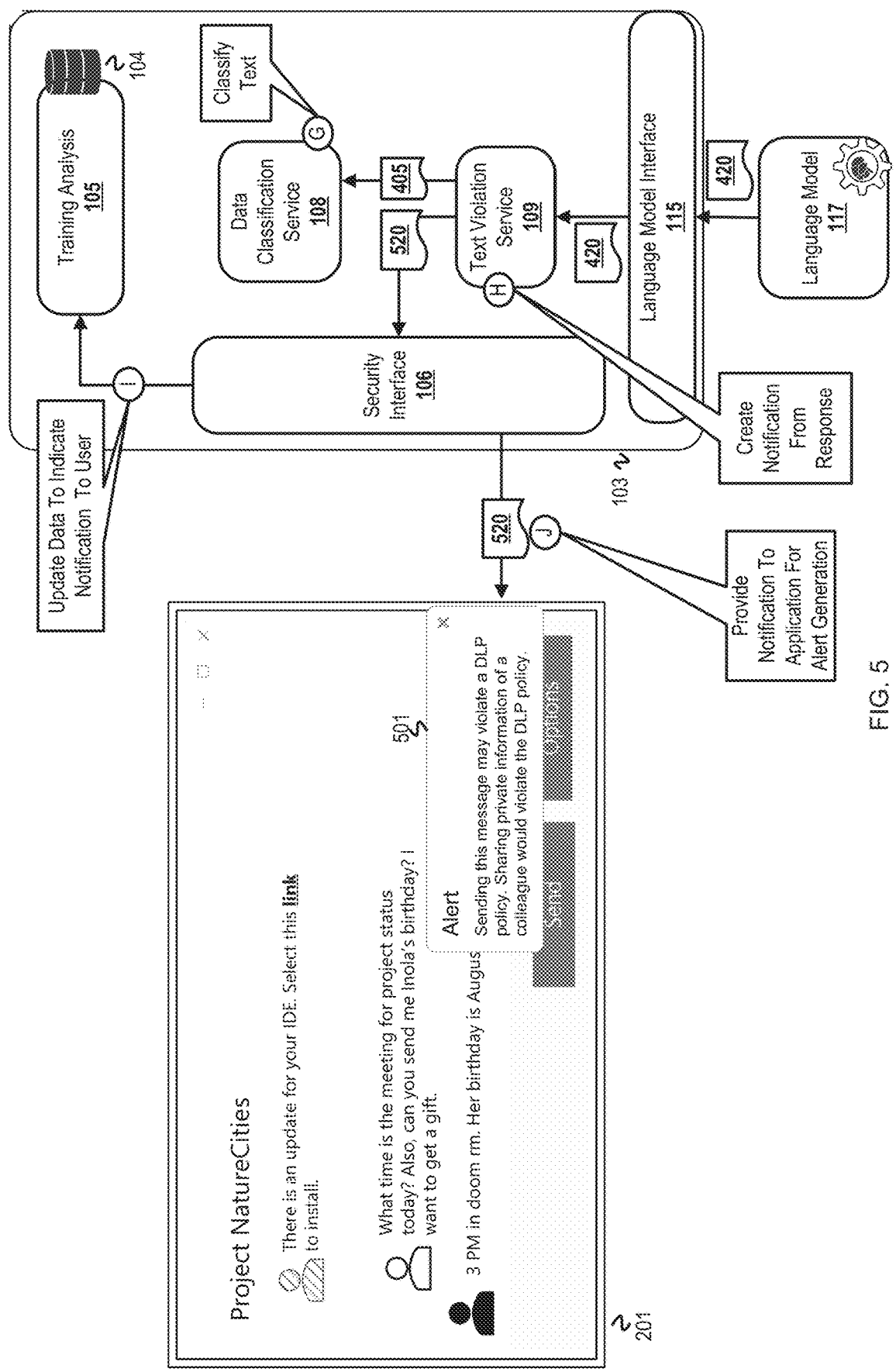

FIG. 4 and FIG. 5 are diagrams of an example scenario corresponding to text intended to be transmitted as an outgoing communication and together depict stages A-J. In FIG. 4, the user interface 201 presents another incoming communication. This incoming communication states "What time is the meeting for project status today? Also, can you send me Inola's birthday? I want to get a gift." An event 401 is detected corresponding to this incoming message. At stage A, the security interface 106 detects the incoming communication event 401, but the incoming communication event 401 does not result in an alert in this illustration. The same sequence of operations as illustrated in FIG. 2 are not repeated for the text captured from the event 401 in FIG. 4 due to illustration space constraints, but the response from the language model 117 will indicate that the text does not correspond to a phishing attack. This results in no notification being generated.

At stage B, the security interface 106 detects a series of events each indicating a communication intended to be outgoing. For instance, the events 403 indicate successive entry of characters into text input field of the user interface 101 that eventually accumulate to the communication "3 PM in Doom rm. Her birthday is." The security interface 106 will have subscribed or registered interest in these types of events of the user interface 101. As input is entered into the field of the user interface 101, the events 403 are generated.

At stage C, the security interface 106 routes text 405 captured from the events to the text violation service 109. The security interface 106 is programmed to accumulate text from a series of events related to an input field for an outgoing communication. When captured text of the events is sufficient (e.g., a sufficient number of tokens or characters relative to a defined threshold), the security interface 106 selects the text violation service 109 based on these events being for an outgoing communication.

At stage D, the text violation service 109 retrieves a task instruction set corresponding to data leakage detection and analysis from the repository 113. A few examples of task instructions in a test instruction set for data leakage detection and analysis include determining an owner of the data, determining a location of a data, determining extent of the leakage, etc.

At stage E, the text violation service 109 forms a prompt with the captured text 405 and the retrieved task instruction set. Similar to the phishing detection service 107, the text violation service 109 can append the captured text 405 to the retrieved task instruction set. Alternatively, the text violation service 109 can populate a template with the retrieved task instruction set and captured text. The text violation service 109 then submits the formed prompt to the language model interface 115.

At stage F, the language model interface 115 receives the prompt from the text violation service 107 and submits the prompt to the language model 117. Stage F also includes receipt of a response 420 by the language model interface 115 from the language model 117.

In FIG. 5, the security tool 103 processes the response 420 from the language model 117. The example operations depicted in FIG. 5 presume that the response 420 from the language model 117 indicates that the captured text 405 includes restricted or sensitive data and would violate a data leakage prevention policy if transmitted. The response 420 flows through the language model interface 115 to the text violation service 109. At stage G, the text violation service 109 passes the captured text 405 to the data classification service 108 to be classified. The data classification service 108 classifies text that has been determined to be restricted/sensitive according to a classification paradigm of the organization corresponding to the application (e.g., secret, confidential, personal information, etc.). As an example, the data classification service 108 can be a language model maintained internal to the organization to ensure sensitive data is not transmitted external to the organization or through unprotected channels. At stage H, the text violation service 109 creates a notification 520 from the response 420. The text violation service 109 may create the notification 520 with indications of the lack of response or disregard task instructions that lack responses. The text violation service 109 passes the notification 520 to the security interface 106. The security interface 106 communicates with the training analysis component 105 to indicate the notification 520. At stage I, the training analysis component 105 updates the repository 104 to indicate the text violation notification 520 created for the user associated with the active session of the user interface 201. At stage I, the security interface 106 provides the notification 520 to the application of the user interface 201 for alert generation. Accordingly, the user interface 201 generates an alert 501. The alert 501 in FIG. 5 indicates the message "Sending this message may violate a DLP policy. Sharing private information of a colleague would violate the DLP policy." The alert 501 should prevent the user from sending the text while also training the user to be aware of the types of information that should not be transmitted.

Figure 6:
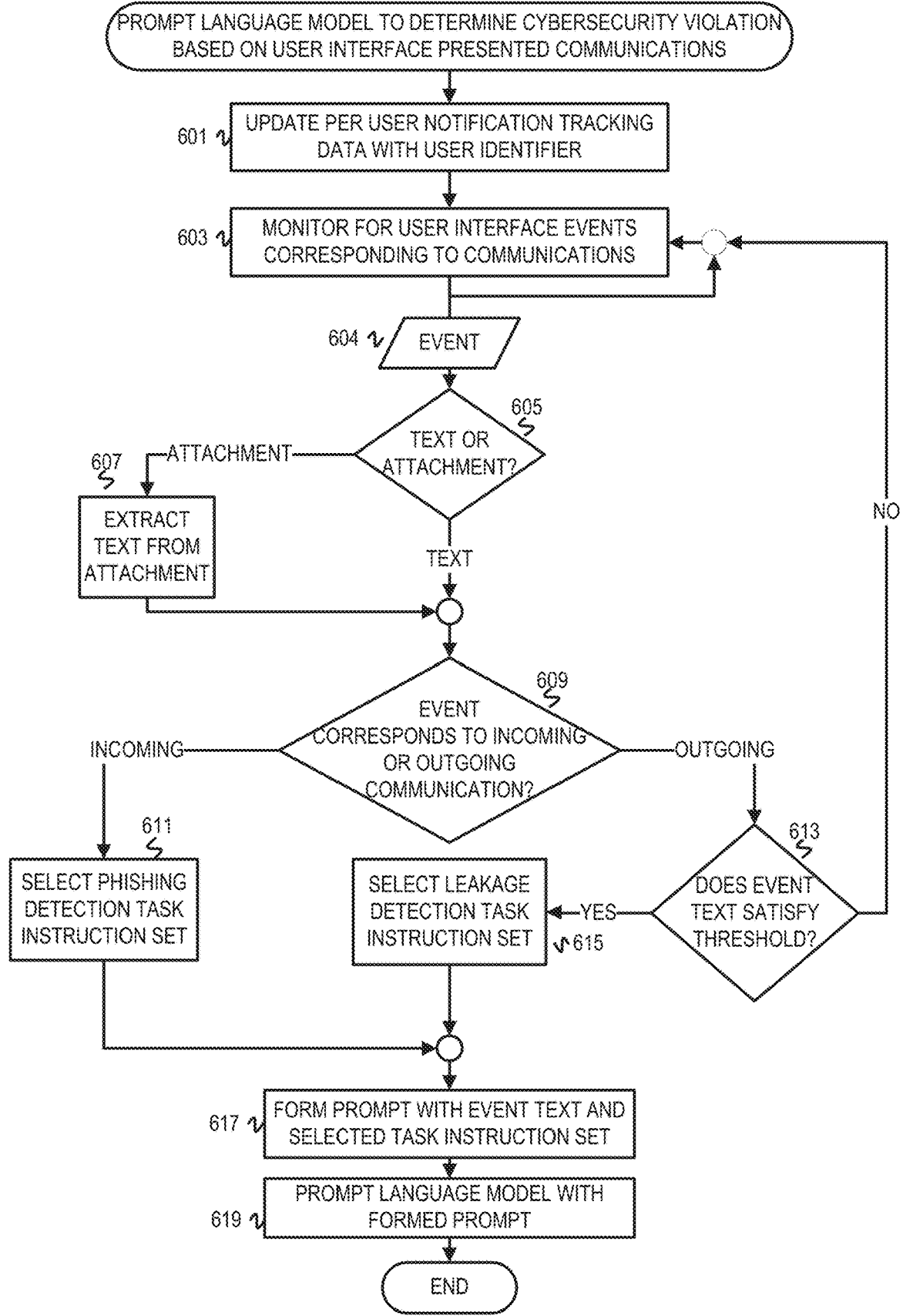
FIG. 6 is a flowchart of example offer operations for prompting a language model to determine cybersecurity violations based on user interface presented communications.
Figure 7:
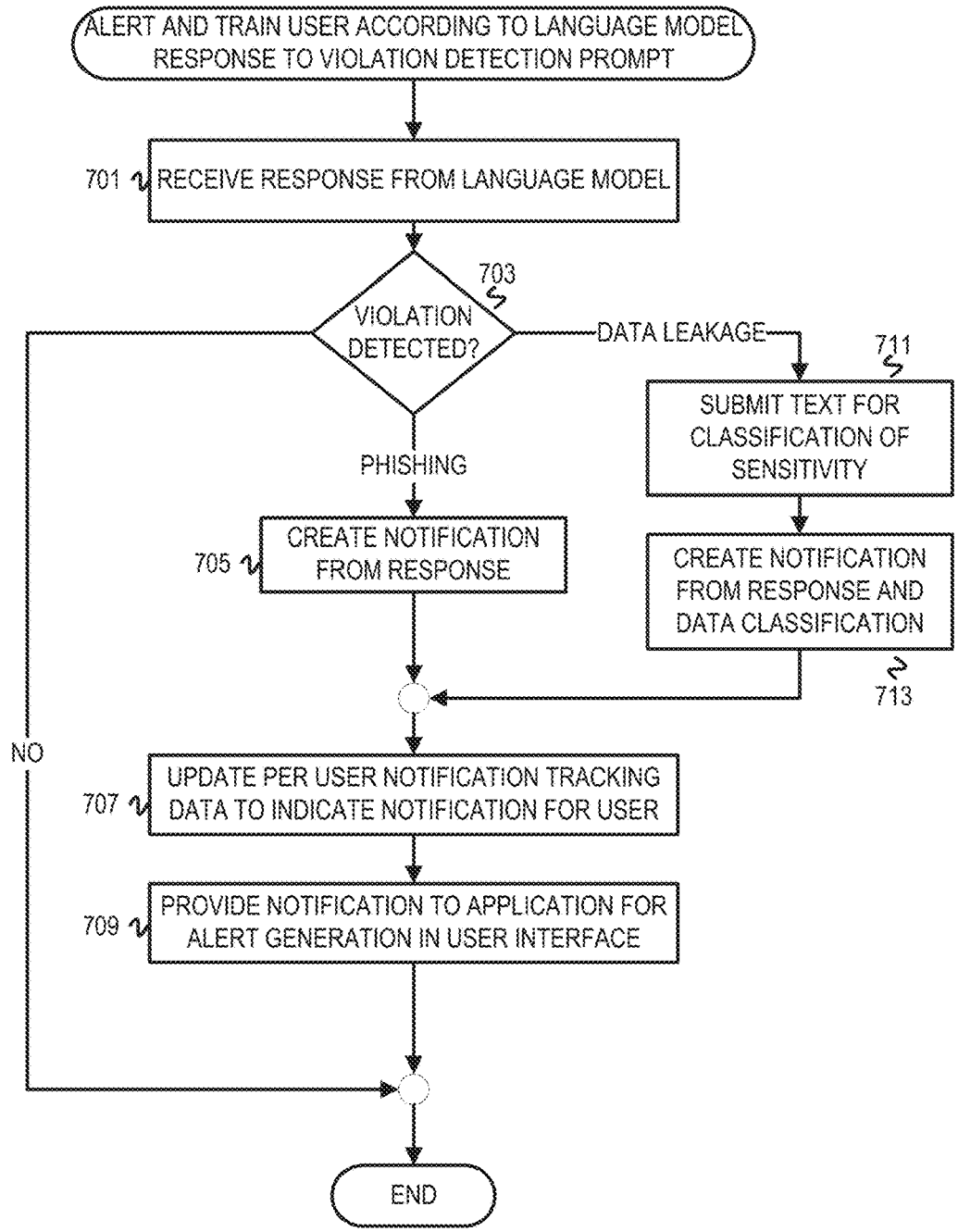
FIG. 7 is a flowchart of example operations for alerting and training a user according to a language model response to violation detection prompt.

While the diagrams of FIGS. 2-5 depict particular scenarios, FIGS. 6 and 7 are flowcharts of example operations that are not specific to those scenarios. The example operations of FIGS. 6 and 7 are described with reference to a security tool for consistency with the earlier description. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 6 is a flowchart of example operations for prompting a language model to determine cybersecurity violations based on user interface presented communications. The security tool has visibility of events generated for a user interface of an application. For example, the security tool is a plugin or extension that has registered for notifications or intercepts events. The security tool can limit interests to those events corresponding to an outgoing communication (e.g., text or attachment inserted into an input field) or an incoming communication presented via the user interface.

At block 601, the security tool updates per user notification tracking data with a user identifier. It is presumed that an organization maintains a database or repository of this notification data that is exactly accessible to multiple instances of the security tool. With the notification data being tracked per user, analysis of behavior in relation to notifications of several security violations can be at different levels. For instance, an organization can assess risk of individual users based on trends and notifications. In addition, an organization can analyze behavior of aggregates of individuals, such as at a department level or an organization wide level. The security tool can record the user identifier into the per user notification tracking data when the user logs in or launches the application.

At block 603, the security tool monitors for user interface events corresponding to communications. This monitoring is ongoing while the user interface is active as depicted by the arrow flowing back to block 603. At some point, the security tool detects an event 604.

At block 605, the security tool determines whether the event indicates text or an attachment, such as an image or file. If the event indicates text, then operational flow proceeds to block 609. If the event indicates an attachment, then operational flow proceeds to block 607.

At block 607, the security tool extracts text from the attachment. An attachment may be a photo, video, or audio recording that includes sensitive data or information or is being utilized in an attack. In the case of an image, the security tool invokes a function to perform optical character recognition (OCR) on the attachment to extract any text. Alternatively, the security tool passes the attachment to an OCR tool and receives extracted text from the OCR tool. In the case of video or audio, a transcript can be extracted from metadata of the attachment if available. If a transcript is not available, then the attachment can be passed to a tool that generates text from audio of either the video or audio attachment. If the attachment is a different type of attachment, then the security tool can use other functionality to extract text. For example, the attachment may be a data file or source code file. Assuming a filter has not been established for preventing transmission of these types of files, the security tool can extract text from the attachment by copying a portion of the data or text within. Operational flow proceeds to block 609.

At block 609, the security tool determines whether the event corresponds to an incoming communication or an outgoing communication. If the event corresponds to an incoming communication, then operational flow proceeds to block 611. If the event corresponds to an outgoing communication, then operational flow proceeds to block 613.

At block 611, the security tool selects a phishing detection task instruction set. Since the event corresponds to an incoming communication, the incoming communication may be a phishing attempt. The phishing detection instruction set can include sub-task instructions that have dependencies with each other. In addition, the task instruction set can specify a format for the response. For instance, the phishing detection instruction set can include sub-tasks for intent recognition of the text and classification of the text depending on the intent. Below is one example of a set of task instructions for phishing detection.

1. Classify intent of the text as one of Information, Question, Lure, Alert, Threat, or Alert
   1.1. If the text is asking a question, determine whether the text is asking for one of the following: a) a password or secret, b) a one time password, c) personal information, or d) credit card details
2. Classify the text as actionable if the text is asking for an action to be performed.
   2.1 If the text is actionable, determine whether the requested action is outside the current application.
   2.2 If the text is actionable, analyze the text for any urgency
3. Determine whether the text includes a hyperlink
4. Determine whether the text includes financial information
5. Classify the text as potentially harmful if the text intent was classified as one of the following and indicate one of the following reasons for the harmful classification:
   5.1 Intent is Lure, and any one of the text requested action outside of the application, the text included a hyperlink, and the text indicated an urgency
   5.2 Intent is Alert, and the text is actionable with urgency or the text includes a hyperlink or the text is an actionable with an action outside of the application
   5.3 Intent is Threat, and the text is actionable, includes a hyperlink, indicates urgency, or requests an action outside of the window
   5.4 Intent is Question, and the text asks for a password or secret or the text indicates financial information
6. Output the response with indication of True/False for potentially harmful and the reason Operational flow proceeds from block 611 to block 617.

At block 613, the security tool determines whether the text of the event satisfies an analysis threshold. Since a few characters are likely not sufficient to determine whether a communication intended to be outgoing violates a data leakage policy, a threshold is defined in terms of tokens or characters. The security tool continues to accumulate text entered until the threshold is satisfied. The threshold can be configurable for an organization. If the threshold has not been satisfied but an input to send the communication is detected, the security tool can proceed with the analysis of captured text and block transmission of the communication. Implementations can forego a threshold check and repeatedly submit text being input for analysis. In some cases, an organization may disregard the cost of invoking the language model repeatedly for text with a low likelihood of violating a DLP policy. If the text captured from the event does not satisfy the threshold, then operational flow returns to block 603. Otherwise operational flow proceeds to block 615.

At block 615, the security tool selects a leakage detection task instruction set. The leakage instruction set can include sub-task instructions that have dependencies with each other. As an example, the task instruction set may be the below.

1. Classify the text as sensitive if the text includes any one of the following: 1.1) password, 1.2) secret, 1.3) username, 1.4) login credentials, 1.5) authentication or authorization key, 1.6) connection string to any database, 1.7) access key, 1.8) secret key, 1.9) PII, 1.10) license details, 1.11) SSN, 1.12) high entropy string, 1.13) credit card details, 1.14) credit card type
2. If the text is classified as sensitive
   2.1 Determine what information will be leaked
      2.1.1 If all characters of the information is masked with a character like '*' then the information is fully masked
      2.1.2 If 4 or more characters are masked with a character like '*' then the information is partially masked
   2.2. Who is the victim of the leak?
   2.3 Where is the leaked information?
      2.3.1 Is the leaked information present in a document, wiki page, secure location, or vault?
   2.4 Otherwise, consider the text as Unsafe
3. Output the response with the category, indication of leakage detected, and a reason Operational flow proceeds from block 615 to 617.

Add block 617, the security tool forms a prompt with the event text and the selected task instruction set. Forming of the prompt can be according to a template or appending the captured text to the selected task instruction set. Embodiments may also maintain a sliding window of events encompassing historical text to capture context and the possibility of sensitive data being communicated across multiple communications. The window size can be defined in terms of number of words or tokens, events, and/or time. For time, a sliding window size can be defined as a time interval measured from a current event time. For instance, a time interval of 15 seconds would capture communications going back 15 seconds from a current communication. For a window size defined in terms of tokens/words, a window can be defined with a window size of 100 tokens to capture m tokens of a current event and preceding 100-$m$ tokens. An example of both time and token parameters being used to define window size would be a window size of 100 tokens that are not older than 100 seconds. An example of window size defined in terms of events, tokens, and time would be a window size 5 events not older than 100 seconds and not exceeding 100 tokens. The parameter(s) for defining window size can be configurable. The sliding window can encompass text extracted from attachments. The window of text preceding a current event can be maintained in memory accessible to the text violation service.

At block 619, the security tool prompts the language model with the formed prompt. As previously mentioned, prompting the language model may be invoking the model and directly inputting the prompt to the language model or invoking the model according to a defined API with the prompt as an argument.

FIG. 7 is a flowchart of example operations for alerting and training a user according to a language model response to a violation detection prompt. Although the descriptions of FIG. 6 and FIG. 7 present example operations that suggest synchronous operation between submitting a prompt and receiving a response, embodiments are not so limited. A user may concurrently receive a communication while entering a message intended to be outgoing. Also, a user may receive multiple incoming communications. Thus, the security tool may prompt the language model corresponding to one communication while receiving a response from the language model that is responsive to a prompt corresponding to a different communication. Implementations can associate prompts and responses with identifiers to facilitate tracking responses.

At block 701, the security tool receives a response from the language model. Implementations may buffer responses depending upon speed of the language model responses and capabilities of the host device of the security tool.

At block 703, the security tool determines whether a violation was detected. The response will indicate that a data leakage violation was detected, a phishing attempt was detected, or no violation was detected. The response may be structured to allow the security tool to read a particular field to determine the verdict indicated in the response. For example, the response can be structured according to a defined JavaScript® Objection Notation object with the verdict indicated in a first key-value pair. If the verdict indicates that no violation was detected, then the process ends. If the verdict indicates that a phishing attempt was detected, then operational flow proceeds to block 705. If the verdict indicates that data leakage was detected, then operational flow proceeds to block 711.

At block 705, the security tool creates a notification from the response. The security tool can maintain a mapping of response fields to notification fields. The security tool would parse the response and populate the appropriate fields of the notification according to the mapping. If the response lacks a response (sub-response or sub-task response) to one of the task instructions of the prompt, the notification can indicate this lack of response for the task instruction or not indicate the lack of sub-response in a notification. Implementations may eschew mapping and instead create the notification from the response without processing. Operational flow proceeds from block 705 to block 707.

At block 711, the security tool submits text for classification of sensitivity. Since the response indicates a verdict that the text captured from an outgoing communication event is likely data leakage, the security tool attempts to add additional information about sensitivity. The additional information about sensitivity (e.g., whether the text includes confidential data or secret data) allows for a more informative alert which can be viewed as more helpful training. The security tool utilizes a separate classifier to determine sensitivity since the classification can be organization specific and to maintain information about the organization's classification of sensitive data internally. Embodiments do not necessarily perform operations corresponding to block 711. A data leakage verdict can proceed without data classification.

Add block 713, the security tool creates a notification from the response and the data classification. This is similar to the description of block 705 with the addition of the data classification. Implementations may include the data sensitivity classification for updating the per user notification data and not include the data sensitivity classification in the notification. As mentioned, block 711 is an optional operation. In the case of the operation(s) corresponding to block 711 not being performed, the notification would not be created to indicate a data classification. Operational flow proceeds from block 713 to block 707.

At block 707, the security tool updates the per user notification tracking data to indicate the notification for the user. To inform risk assessment, the security tool can update the per user notification tracking data with various information from the notification and about the notification depending upon configuration by the organization. For example, the security tool can update the per user notification tracking data with the type of violation and time of the notification.

At block 709 the security tool provides the notification to the application corresponding to the user interface. The security tool provides the notification to facilitate alert generation in the user interface. For example, the security tool invokes a function defined by an API of the application to generate the alert and passes the notification as an argument or content of the API call. Depending upon the amount of information available and or amount of integration between the security tool and the user interface, the security tool can provide additional information to allow the user interface to present the alert proximate to a corresponding communication.

The example operations of FIG. 7 presume an alert to a user will prevent a violation, especially in the case of a data leakage violation. However, blocking interaction with a communication determined to be a likely phishing attempt or blocking transmission of a communication that likely includes sensitive information can be implemented. Since the security tool interacts with the application being monitored but is not part of the application, the security tool can implement blocking depending upon the application. The security tool can call an API function that blocks a message to be from sending or prevents interaction with a received message that is likely a phishing attempt if the application provides the API function. An application may provider an API call or inter-process communication from the security tool that requests the application to take an enforcement action (e.g., blocking sending of a message or isolating a likely phishing attempt).

Variations

Embodiments can utilize the per user notification tracking data differently. As an example, the per user notification tracking data can compare behavior of an entity before and after a training event. As an example, the number of notifications per type of violation across a department before a department wide training event can be compared to the department behavior afterwards. An embodiment can accumulate tracking data for a same or similar time period after a training event as before the training event (e.g., 60 days prior to the training event and 60 days afterwards). Embodiments can also configure the security tool to require completion of a training module for any user with notifications for a violation type (e.g., data leakage violation notifications) that exceed a defined mitigation or intervention threshold. For instance, the security tool may have an intervention threshold set with volume and time parameters (e.g., 10 data leakage notifications during a 12 hour period).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the data sensitivity classification can be in parallel with the data leakage detection. Referring specifically to FIGS. 6 and 7, the example operations of block 711 can be performed in parallel with blocks 617 and/or 619. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
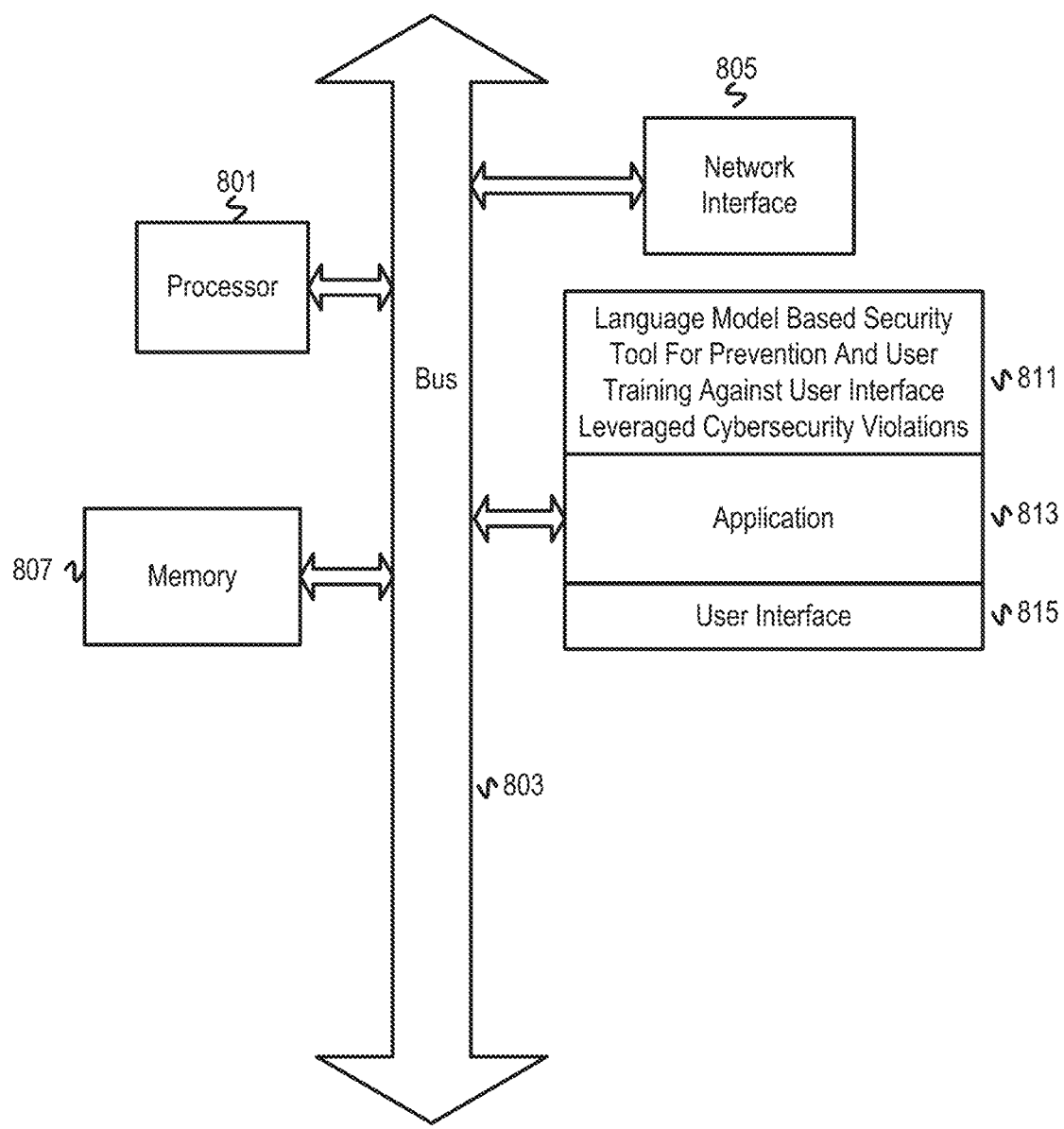
FIG. 8 depicts an example computer system with a language model based security tool for prevention of and user training against user interface leveraged cybersecurity violations.

FIG. 8 depicts an example computer system with a language model based security tool for prevention of and user training against user interface leveraged cybersecurity violations. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes a language model based security tool 811 associated with an application 813 which has a user interface 815. The language model based security tool 811 monitors events of the application 813 that relate to communications presented via the user interface 815. The language model based security tool 811 captures text of the events and forms prompts with task instruction based on the text being for an incoming communication or a to-be outgoing communication. The language model based security tool 811 submits the formed prompt to a language model to obtain a response which will include a verdict of whether receipt of the text or sending the text would be a cybersecurity violation. The language model based security tool 811 generates a notification if the response indicates a positive verdict (i.e., violation detected) and supplies the notification to the application 813 for generation of an alert via the user interface 815. The alert operates to both prevent the violation and train the user to recognize the violation and increase awareness. The language model based security tool 811 also tracks generation of notifications over time to facilitate drill-down analysis of behavior from an organization wide level down to an individual user level. Risk can be assessed based on trends in notifications with breakdowns by violation type. Risk can be assessed at the different levels with different aggregations of per user notification data over time. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

The invention claimed is:

1. A method comprising:
    capturing first text of a user interface of an application based on a user interface event, wherein capturing the first text comprises polling the user interface for user interface events and, based on each user interface event corresponding to a communication intended as outgoing, successively determining whether text accumulated from the user interface event and preceding user interface events is sufficient text;
    selecting from a plurality of sets of task instructions based, at least in part, on whether the user interface event indicates the first text is incoming or is intended as outgoing in the context of the user interface, wherein selecting from the plurality of sets of task instructions is also based on a determination that the first text, which is an accumulation of texts of multiple of the user interface events, has sufficient text with respect to a threshold;
    forming a prompt with the first text and the selected set of task instructions;
    submitting the prompt to a language model;
    determining whether a response from the language model indicates a cybersecurity violation corresponding to the first text;
    based on the response indicating that the first text corresponds to a cybersecurity violation, causing generation of a notification in the user interface based on the response; and
    updating data indicating notifications per user based on the generated notification.

2. The method of claim 1 further comprising determining whether the first text is intended to be outgoing or is incoming.

3. The method of claim 1, wherein selecting from the plurality of sets of task instructions comprises selecting a first set of task instructions related to determining whether the first text corresponds to a phishing attack if the first text is incoming and selecting a second set of tasks instructions related to determining whether the first text corresponds to data leakage if the first text is intended as outgoing.

4. The method of claim 1 further comprising detecting a non-text object, wherein capturing the first text comprises processing the non-text object, wherein processing the non-text object comprises at least one of:
    applying optical character recognition (OCR) to the non-text object which comprises an image; and
    determining a transcript from the non-text object which comprises video or audio.

5. The method of claim 1 further comprising assessing risk of behavior of an entity based, at least in part, on a dataset that includes the updated data, wherein the entity is one of a user, group of users, and an organization.

6. The method of claim 5 further comprising comparing first behavior of a first user as represented by data of the per user notification data of the first user and prior to training of the first user and second behavior of the first user as represented by data of the per user notification data of the first user subsequent to the training.

7. A non-transitory, machine-readable medium having program code stored thereon, the program code comprising instructions to:
    detect a first communication either received by an application or input to be transmitted from the application, wherein the first communication is presented via a user interface, wherein the instructions to detect the first communication comprise instructions to poll the user interface for user interface events and, based on each user interface event corresponding to a communication to be transmitted, successively determine whether text accumulated from the user interface event and preceding user interface events is sufficient text;
    select from a plurality of task instruction sets based, at least in part, on whether the first communication was received or is to be transmitted, wherein the instructions to select from the plurality of task instruction sets comprise the instructions to select also based on a determination that the accumulated text has sufficient text with respect to a threshold;
    form a prompt with text of the first communication and the selected task instruction set;
    submit the prompt to a language model;
    based on a response from the language model indicating that the first communication is a cybersecurity violation, cause generation of a notification via the user interface based on the response; and
    update data indicating notifications per user based on a generated notification.

8. The non-transitory, machine-readable medium of claim 7, wherein the instructions to update data indicating notifications per user comprise instructions to update the data to indicate generation of the notification and a user identifier corresponding to the first communication.

9. The non-transitory, machine-readable medium of claim 8, wherein the program code further comprises instructions to record the user identifier based on detection of the first communication.

10. The non-transitory, machine-readable medium of claim 7, wherein the cybersecurity violation corresponds to data leakage or phishing.

11. The non-transitory, machine-readable medium of claim 7, wherein the program code further comprises instructions to determine whether the first communication was received or has been input to be transmitted.

12. The non-transitory, machine-readable medium of claim 7, wherein the instructions to select from the plurality of task instruction sets comprise instructions to select a first task instruction set related to determining whether the first communication corresponds to a phishing attack if the first communication was received and to select a second task instruction set related to determining whether the first communication corresponds to data leakage if the first communication is to be transmitted.

13. The non-transitory, machine-readable medium of claim 7, wherein the program code further comprises instructions to:
    based on a determination that the first communication comprises a non-text object, process the non-text object to determine the text,
    wherein the instructions to process the non-text object comprise instructions to,
    apply optical character recognition (OCR) to the non-text object if the non-text object is an image; and
    determine a transcript from the non-text object if the non-text object is video or audio.

14. The non-transitory, machine-readable medium of claim 7, wherein the program code further comprises instructions to assess risk of behavior of an entity based, at least in part, on a dataset that includes the updated data, wherein the entity is one of a user, group of users, and an organization.

15. An apparatus comprising:
a processor; and
a non-transitory machine-readable medium having instructions stored thereon, the instructions executable by the processor to cause the apparatus to,
detect a first communication either received by an application or input to be transmitted from the application, wherein the first communication is presented via a user interface, wherein the instructions to detect comprise instructions executable by the processor to cause the apparatus to poll the user interface for user interface events and, based on each user interface event corresponding a communication to be transmitted, successively determine whether text accumulated from the user interface event and preceding user interface events are sufficient text;
select from a plurality of task instruction sets based, at least in part, on whether the first communication was received or is to be transmitted, wherein the instructions to select from the plurality of task instruction sets comprise the instructions being executable to select also based on a determination that the accumulated text has sufficient text with respect to a threshold;
form a prompt with text of the first communication and the selected task instruction set;
submit the prompt to a language model;
based on a response from the language model indicating that the first communication is a cybersecurity violation, cause generation of a notification via the user interface based on the response; and
update data indicating notifications per user based on a generated notification.

16. The apparatus of claim 15, wherein the instructions to select from the plurality of task instruction sets comprise instructions executable by the processor to cause the apparatus to select a first task instruction set related to determining whether the first communication corresponds to a phishing attack if the first communication was received and to select a second task instruction set related to determining whether the first communication corresponds to data leakage if the first communication is to be transmitted.

17. The apparatus of claim 15, wherein the non-transitory machine-readable medium further has stored thereon instructions executable by the processor to cause the apparatus to:
based on a determination that the first communication comprises a non-text object,
process the non-text object to determine the text,
wherein the instructions to process the non-text object comprise instructions to,
apply optical character recognition (OCR) to the non-text object if the non-text object is an image; and
determine a transcript from the non-text object if the non-text object is video or audio.

\* \* \* \* \*